United States Patent [19]

Lafosse et al.

[11] 4,382,711
[45] May 10, 1983

[54] DEVICE FOR THE REMOTE COUPLING AND UNCOUPLING OF TWO ELEMENTS OF GREAT LENGTH DISPOSED COAXIALLY AND END TO END

[75] Inventors: Claude Lafosse, Le Plessis Robinson; Jacques Lepetit, Paris, both of France

[73] Assignee: Framatome, Courbevoie, France

[21] Appl. No.: 183,562

[22] Filed: Aug. 29, 1980

[51] Int. Cl.³ .............................................. F16B 7/04
[52] U.S. Cl. .................................. 403/290; 403/316; 376/233
[58] Field of Search ...................... 403/290, 316, 317; 376/233, 268

[56] References Cited

U.S. PATENT DOCUMENTS

| | | | |
|---|---|---|---|
| 3,107,209 | 10/1963 | Frisch | 376/233 |
| 3,337,257 | 8/1967 | Brynsvold | 376/233 X |
| 3,408,101 | 10/1968 | Savary | 376/233 |
| 3,494,827 | 2/1970 | Zinn | 376/233 |
| 3,604,746 | 9/1971 | Notari | 376/233 X |
| 3,698,756 | 10/1972 | Groves | 166/216 X |
| 3,857,599 | 12/1974 | Jones et al. | 376/233 X |
| 4,110,157 | 8/1978 | Jabsen | 376/233 |
| 4,147,589 | 4/1979 | Roman et al. | 376/233 |

FOREIGN PATENT DOCUMENTS 26172 4/1981 European Pat. Off. .
1251338 10/1971 United Kingdom .

*Primary Examiner*—Andrew V. Kundrat
*Attorney, Agent, or Firm*—Pollock, Vande Sande & Priddy

[57] ABSTRACT

Device for the remote coupling and uncoupling of two elements of great length disposed coaxially and end to end, comprising an internal actuating sleeve (14) mounted for rotation on one of the elements (1, 5) and rigidly connected to a rod (10, 67) comprising, at its end, an actuating member (12), the rotation of which enables the coupling and the uncoupling to be effected by spacing apart or release of resilient members (8, 9) assuring the junction of the two elements (1, 5). A pin (17) is disposed transversely at the end of the assembly consisting of the internal sleeve (14) and the rod (10, 67), opposite to the end carrying the actuating member (12). An external sleeve (28) of larger diameter than the diameter of the internal sleeve (14) remaining in a fixed position, whereas the two elements (1–5) are displaced in the direction of their axis, comprises slots (45, 47) in which the pin (17) can engage. A means for driving (30, 33, 35, 41, 43, 44) the external sleeve (28) in rotation enables the internal sleeve (14), the rod (10, 67) and the actuating member (12) to be caused to rotate for the coupling or uncoupling. The invention applies, in particular, the coupling of the control bars of a nuclear reactor with the control rods permitting their displacement in the core of the reactor.

5 Claims, 8 Drawing Figures

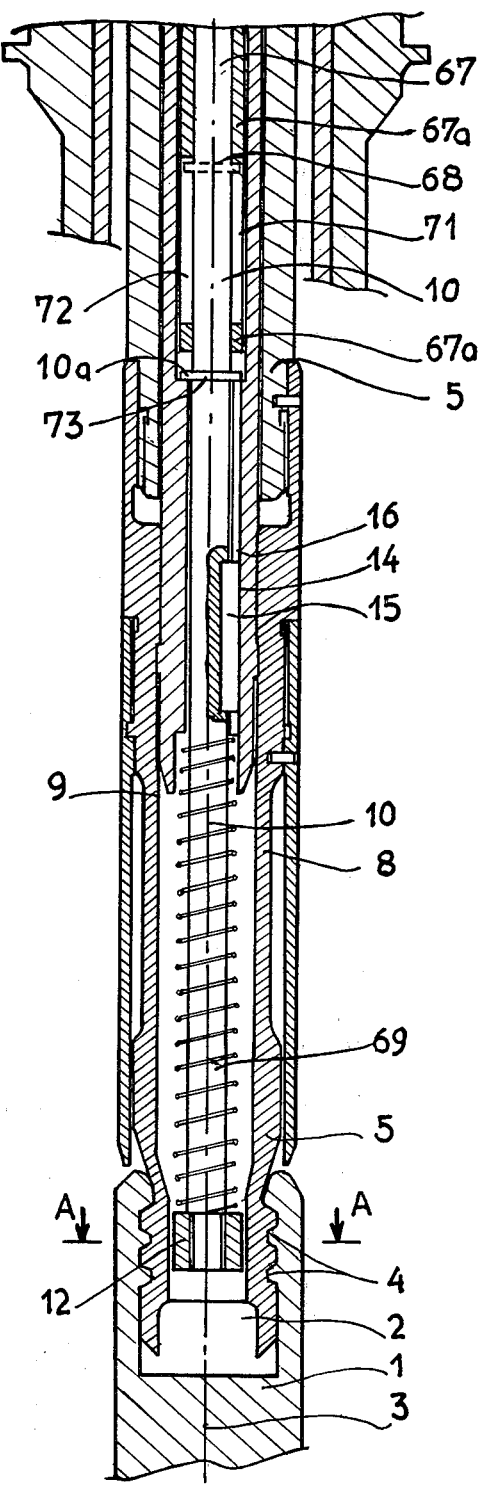
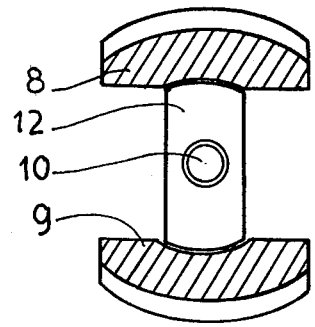
FIG 2
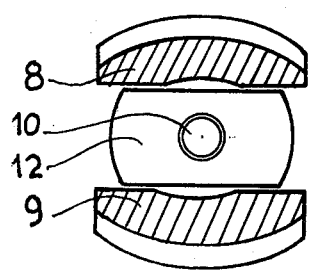
FIG 3
FIG 1

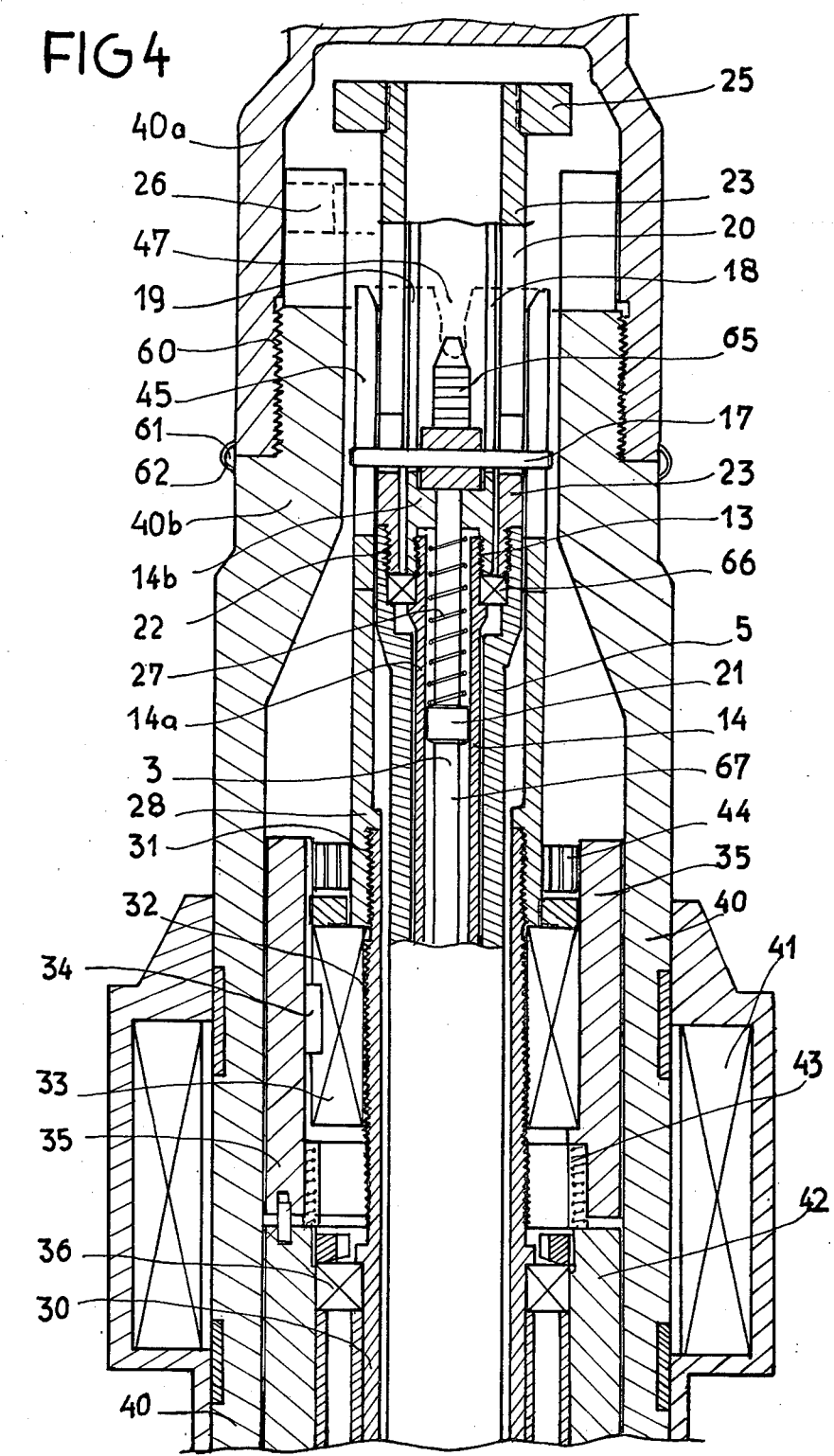

DEVICE FOR THE REMOTE COUPLING AND UNCOUPLING OF TWO ELEMENTS OF GREAT LENGTH DISPOSED COAXIALLY AND END TO END

FIELD OF THE INVENTION

The invention relates to a remote coupling and uncoupling device for two elements of great length disposed coaxially and end to end, one of these elements being a drive element with axial displacement between two extreme positions as a result of a means of displacement and the other a driven element exerting a force resisting the drive.

BACKGROUND OF THE INVENTION

For the power control of nuclear reactors and for the emergency stoppage of these reactors in the event of a breakdown, assemblies of elements absorbing the neutrons are used which are displaced between the fuel elements in the core of the reactor, in order to increase or to reduce their insertion inside the core, which tends to reduce or to increase the power emitted by the core.

The displacement of these assemblies of absorbing material of great length is generally effected by means of a drive element for the absorbing assembly, consisting of a rod of great length connected at one of its ends to the absorbing assembly and disposed coaxially in relation to this assembly.

In the case of pressurized water reactors, in particular, each absorbing assembly consists of tubes enclosing a material which absorbs the neutrons and is inserted vertically inside the fuel assemblies, constituting the core of the reactor, to a greater or lesser depth, as a result of a control rod disposed vertically, and to the lower portion of which there is fixed the absorbing assembly called the control rod, this control rod being displaced vertically in a precisely controlled manner by means of a mechanical or electromagnetic device.

In order to obtain the emergency stoppage of the reactor, the control rod is released so that this rod and the absorbing element which is connected thereto fall into the core of the reactor in their position of maximum insertion under the effect of gravity.

The control rod is generally connected, by its lower portion, to the upper portion of the absorbing assembly by means of a device consisting of at least two deformable resilient metallic parts disposed at the base of the control rod and a spacing member fixed to the end of a central rod, disposed along the axis of the control rod and the purpose of which is to maintain in position the resilient metallic parts in seatings machined in the upper portion of the absorbing element.

When the spacing member is held at the level of the resilient parts, these parts cannot approach one another under the effect of the weight of the absorbing element when this element, suspended from the control rod, is displaced vertically.

In prior art devices, the spacing member has to be displaced in axial translation in order to be able to release the absorbing element and to separate it from its control rod. In fact, if the spacing member is moved away, by axial translation, from the deformable attachment members for the absorbing element, the weight of the absorbing element, on an upward movement of the control rod, causes the deformation of the resilient attachment parts, and these deformable parts are designed so as then to slide inside the seatings of the absorbing element and release this element, the movement of the control rod continuing without the absorbing assembly being entrained.

Nevertheless, in order to effect the displacement of the spacing member by axial translation of the central rod, it is necessary to have direct access to the control rod to effect the movement of vertical translation manually.

In the prior art devices, particularly for pressurized water reactors, this operation can only be carried out after the reactor has been stopped and depressurized, and after either the cover of the tank under pressure containing the nuclear core, or the sealed casing of the mechanism controlling the controlled displacement of the control rod, has been dismounted.

It is necessary to proceed thus, particularly during the operations of recharging the reactor with fuel, because it is necessary to separate the control rods and the absorbing elements prior to these operations. In pressurized water reactors, this separation operation takes a fairly long time, which prolongs the period of stoppage of the reactor, and requires manual intervention in an atmosphere which may be contaminated, which makes it necessary to take particularly onerous and constricting precautions.

On the other hand, in the course of these recharging operations, both in the case of pressurized water reactors and in the case of high-temperature reactors or fast-neutron reactors cooled by liquid metals, it may be of interest to dispose the control rods in a high position after having uncoupled them from the absorbing assemblies. The operations of replacement of the fuel are thus greatly facilitated either at the moment of lifting the tank cover, in the case of pressurized water reactors, or during the actual recharging in the case of high-temperature reactors or fast-neutron reactors where the roof the tank remains in position during the recharging.

To date, no coupling or uncoupling device was known for two elements of great length, such as a control rod and an element absorbing the neutrons of a nuclear reactor, which permits operation in a reliable, automatic and remote manner, i.e. in all the cases where it is not easily possible to have access to the junction zone between the elements, or even when this access is impossible and it is necessary to operate in a perfectly sealed manner.

SUMMARY OF THE INVENTION

The object of the invention is therefore a remote coupling and uncoupling device for two elements of great length disposed coaxially and end to end, one of these elements being a drive element with axial displacement between two extreme positions as a result of a displacement means, and the other a driven element exerting a force resisting the drive, the drive element comprising, at one of its ends, to assure the junction, at least two portions with resilient deformation in a direction perpendicular to the axis of the elements, which are held spaced apart in the junction position, in which position they engage in a seating formed at one end of the driven element, by a spacing member with axial displacement fixed to the end of a central rod disposed along the axis of the elements, this device being intended to permit automatization of the coupling and uncoupling operations in applications where the junction zone of the elements is not accessible, the operations having to take place in an extremely reliable manner.

For this purpose, the device comprises:

a cylindrical internal actuating sleeve coaxial with the drive element, mounted for rotation about its axis on this element and rigidly connected, at one of its ends, to the central rod carrying the spacing member, this spacing member not being symmetrical in revolution in relation to the axis and having such dimensions that, by rotation of the central rod about the axis of the device, it is possible to bring the member into a position where the resilient junction parts are spaced apart, or into an out of service position where it is no longer in contact with the resilient parts, then permitting their approach;

a pin disposed transversely in relation to the axis of the device, fixed to the end of the assembly constituted by the internal actuating sleeve and the central rod and opposite to the end rigidly connected to the spacing member;

an external actuating sleeve, coaxial with the drive element, with a diameter greater than the diameter of the internal sleeve, disposed in a fixed axial position in relation to the elements and for rotation about its axis, connected to a drive means in rotation in one direction and in the other with an amplitude of rotation equal to the angle of rotation necessary to displace the spacing member between its positions in and out of service, and comprising, on its lateral surface, two longitudinal slots, the axial displacement of the elements bringing the pin, in the vicinity of one of the extreme positions of these elements, inside the slots in the actuating sleeve which can then displace in rotation the assembly carrying the spacing member for the coupling or the uncoupling of the elements of great length.

Likewise the object of the invention is a coupling and uncoupling device in the case where the elements of great length are disposed vertically, the drive element being movable between a low uncoupling position and a high position where it can be held locked independently of the action of its displacement means.

For this purpose:

the drive element comprises a locking groove at its lower portion, and the external actuating sleeve comprises a stud directed towards the interior of the sleeve.

When the drive element is in the high position, it is possible, by combined movements of translation of the drive element and of rotation of the external sleeve, to control remotely the engagement of the stud in the groove, and thus to constitute a bayonet connection which enables the drive element to be maintained in the high position in a reliable manner and without the consumption of energy.

BRIEF DESCRIPTION OF THE DRAWINGS

In order to explain the invention, one form of embodiment of the coupling and uncoupling device according to the invention will now be described by way of non-limiting example, with reference to the accompanying drawings, in the case of a control rod associated with an absorbing assembly displaced vertically in the core of a pressurized water nuclear reactor.

FIG. 1 represents, in a section view through a plane passing through the axis of the device, the lower end of this device, at the level of the lower portion of the control rod and the upper portion of the control bar.

FIGS. 2 and 3 are section views along line A—A of FIG. 1, the deformable resilient parts being respectively in operative and inoperative positions.

FIG. 4 represents a section view through a plane passing through the axis of the device, of the upper portion of this device, at the level of the sealed casing of the control mechanism of the absorbing element.

DETAILED DESCRIPTION

Figure 5:
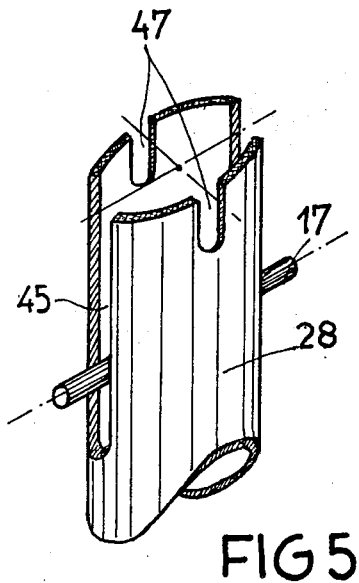
FIG. 5 represents a perspective view of the device at the level of the external actuating sleeve, when the control rod is in the low position.

FIG. 1 shows the upper portion of the structure 1 of the element which absorbs the neutrons.

In its upper portion illustrated, this structure 1 comprises a seating 2 symmetrical in revolution in relation to the axis 3 of the absorbing element inside which there are machined grooves 4 constituting an attachment surface for the junction means between the control rod 5 constituting the drive element and the structure 1 of the absorbing assembly constituting the driven element.

The junction means consist of resilient strips 8 and 9 fixed to the control rod 5 at its lower end, the section of which is visible in FIGS. 2 and 3.

The end of the resilient strips 8 and 9 is machined in such a manner that these strips can engage in the seating 2 and that flanges machined on the strips engage in the grooves 4.

The control rod 5 is connected to a drive mechanism permitting its displacement in the direction of the axis 3 for the corresponding displacement of the absorbing element inside the core of the nuclear reactor.

The displacement mechanism of the control rod 5 is not illustrated but it may consist, for example, of a rack which may be fixed to the control rod 5 or even be machined on this control rod, and actuated by a pinion for its axial displacement.

A lower central rod 10 is disposed along the axis 3 of the control rod 5 and carries at its end a spacing member 12 for the strips 8 and 9, this spacing member 12 being at the level of the end of the strips 8 and 9 engaged inside the seating 2 of the structure of the absorbing element.

This spacing member 12, the dimensions of which are assymmetrical in relation to the axis 3, enables the strips 8 and 9 to be held either in the operative position where the junction is assured between the control rod and the absorbing element (FIG. 2) or in the inoperative position where the strips 8 and 9 can approach one another and release the absorbing element (FIG. 3).

The lower central rod 10 is connected to an internal actuating sleeve 14 by means of a key 15 disposed in a groove 16 in the sleeve 14 and enabling the lower central rod 10 and the internal sleeve 14 to be united for rotation about the axis 3.

The lower central rod 10 comprises a collar 10a which abuts against a facing 73 machined in the sleeve 14. A spring 69, mounted between the sleeve 14 and the spacing member 12, holds the rod 10 in the low position.

Referring to FIG. 4, it will be seen that the internal sleeve 14 consists of a tube of great length 14a, the lower portion of which is connected to the rod 10 (see FIG. 1) and the upper portion 14b of which consists of a sleeve connected to the portion 14a by means of a thread 13.

The sleeve 14, coaxial with the control rod 5, is mounted for rotation about its axis inside this rod 5 by means of rolling bearings such as 66.

The lower central rod 10 comprises a pin 68 which engages in two longitudinal grooves 71 and 72 machined in an annular sleeve 67a rigidly connected to the upper central rod 67.

At its upper portion, the rod 67 comprises a pin 17 which is transverse in relation to the axis 3.

The pin 17 is engaged in longitudinal grooves 18 and 19 cut in the lateral surface of the sleeve 14b which enable the movements of rotation to be transmitted between the pin 17 and the actuating sleeve 14, itself connected to the lower central rod 10.

The upper central rod 67 carries elements such as 21 permitting its guiding inside the sleeve 14.

The pin 17 is engaged, on the other hand, in an aperture 20 traversing the lateral wall of a cylindrical member 23 rigidly connected to the control rod 5 by means of a thread 22.

Figure 7:
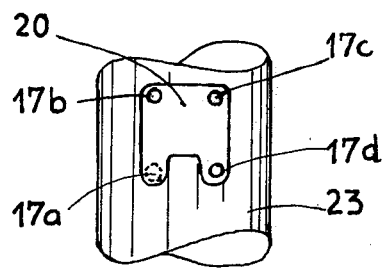
FIG. 7 represents a perspective view of the locking device constituting the upper portion of the mechanism represented in FIG. 4.

The shape of the aperture 20 formed in the cylindrical member 23 is illustrated in FIG. 7.

This member 23, in which the pin 17 engages, permits the locking of the angular position of the member 14, hence of the lower rod 10, i.e. of the spacing member 12 in relation to the control rod 5 and therefore the prevention of an accidental coupling or uncoupling of the device.

The member 23 carries a stop 25 at its end, the purpose of which is to be able to crush a damping device 26 to slow down the control rod 5 on a drop which may occur in the event of accidental fracture of the locking device in the high position of the control rod, when this is separated from the absorbing element.

A spring 27 is disposed between the guide member 21 rigidly connected to the rod 67 and the lower end of the sleeve 14b.

An external sleeve 28 of larger diameter than the internal sleeve 14 is rigidly connected to a sleeve 30 having a screw threaded portion 31 for assembly to an outer sleeve 28 having a threaded portion 32 on its external surface in engagement with a nut 33 rigidly connected to a pole piece 35 of magnetic metal, by means of a key 34.

The sleeve 30 is mounted for rotation by means of rolling bearings such as 36 inside the sealed casing 40 inside which is the upper portion of the coupling and uncoupling mechanism, rigidly connected to the cover of the tank of the nuclear reactor.

The external sleeve 28 is therefore fixed in axial translation and movable in rotation about the axis 3 of the device.

The pole piece 35 can be displaced in axial translation parallel to the axis 3 by means of a coil 41 which, when it is electrically activated, magnetizes a fixed pole piece 42 which attracts the piece 35 which then effects a downward axial movement of translation.

The piece 35 is restored to its position away from the pole piece 42 by the helical spring 43 and by a spiral spring 44 whose coils are coplanar and which is connected to the sleeve 30 and to the external sleeve 28.

When the pole piece 35 effects its movements of translation in one direction and in the other, under the effect of the magnetic force and of the springs, respectively, the nut 33 is driven in a movement of the same amplitude, which entrains the sleeve 30, held against axial translation, in a movement or rotation through a certain angle in one direction and in the other.

In the embodiment described, this angle is 90°, which corresponds to the angle of rotation of the spacing member 12 to cause it to pass from its operative position in which the junction of the control rod and of the absorbing element is effected into its inoperative position in which these two parts are uncoupled.

As can be seen in FIG. 5, the external sleeve 28 comprises a first set of longitudinal slots 45 of great length and a second set of longitudinal slots 47 of shorter length in the axial direction.

When the control rod 5 is in the low position, as illustrated in FIG. 4, i.e., when the absorbing element is in its position of maximum insertion, the pin 17 comes into position inside the slots of great length 45 in the external sleeve 28, and the position of the pin 17 may be situated in a certain range surrounding the mean position of this pin illustrated in FIG. 5. In fact, certain geometrical differences between one absorbing element and another may cause a certain displacement of the position of the pin 17 in the slots 45.

Figure 6:
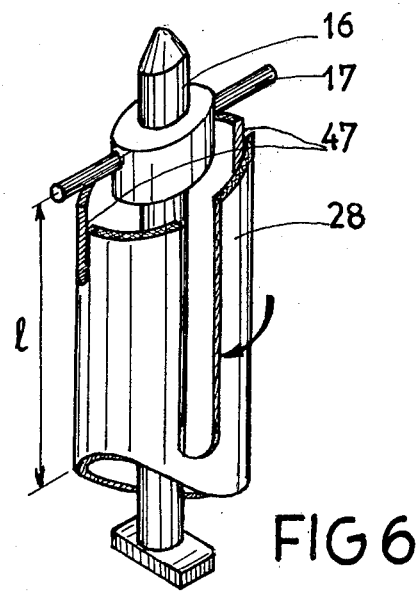
FIG. 6 represents a perspective view of the same device when the control rod is in a position a little above its low position.

When it is desired to uncouple the control rod 5 and the absorbing element 1, the control rod is raised from its low position over a certain length l visible in FIG. 6 and the external sleeve 28 is caused to turn in one direction by feeding the coil 41.

The pin 17 and the central rods 67 and 10 are then in the position illustrated in FIG. 6 in relation to the sleeve 28, in which, after lifting of the assembly connected to the control rod and rotation through a quarter of a turn of the sleeve 28 caused by the feed of the coil 41, the pin 17 has come straight above the short slots 47.

FIG. 7 shows the position of the pin 17 inside the aperture 20 formed in the cylindrical member 23 during the phases represented in FIGS. 5 and 6. In fact, during the phases of the movement, the assembly connected to the control rod 5 is displaced in translation in an identical manner and the pin 17 remains in the locked position 17a inside the aperture 20 in the member 23. In this position, the pin 17 prevents any movement of rotation of the internal sleeve 14 which might cause unlocking of the spacing member 12.

If the control rod 5 and the assembly of parts which are connected thereto are now lowered into the low position again, i.e., over a length l, the pin 17 is deposited in the short slots 47 before the end of the movement of amplitude l and the movement continues by relative displacement of the internal sleeve 14 and of the upper central rod 67 which causes a compression of the spring 27.

On the relative movement of the upper central rod 67 in relation to the sleeve 14, the lower central rod 10 remains in the low position of abutment against the sleeve 14, by means of the collar 10a and the spring 69, the member 67a sliding freely about the rod 10 and the pin 68 as a result of the grooves 71 and 72.

The pin 17 connected to the central rod 67, being displaced in relation to the assembly connected in translation to the control rod 5, comes into the position 17b inside the aperture 20 in the member 23.

In this position, the key 17 can be displaced with the internal sleeve 14 in rotation about the axis 3.

If the feed of the coil 41 is then interrupted, the springs 43 and 44 restore the sleeve 28 to its original position by the inverse rotation to the rotation of a quarter of a turn effected previously.

In the course of this rotation through a quarter of a turn, the pin 17 engaged in the short slots is entrained in a corresponding rotation which is transmitted to the internal sleeve 14 and by means of it to the rod 10 and to the spacing member 12 which releases the strips 8 and 9.

The pin has then come into the position 17c inside the aperture 20.

If the control rod 5 is raised, the relaxation of the spring 27 then restores the pin 17 to the position 17d in which the angular locking is again effected.

In the course of the raising of the control rod, the resilient strips 8 and 9 are no longer held apart by the member 12 and release the absorbing element which, under the effect of its weight, moves the strips 8 and 9 towards one another and causes a relative sliding of these strips and of the seating 2 of the element 1.

The rod can then rise freely.

Figure 8:
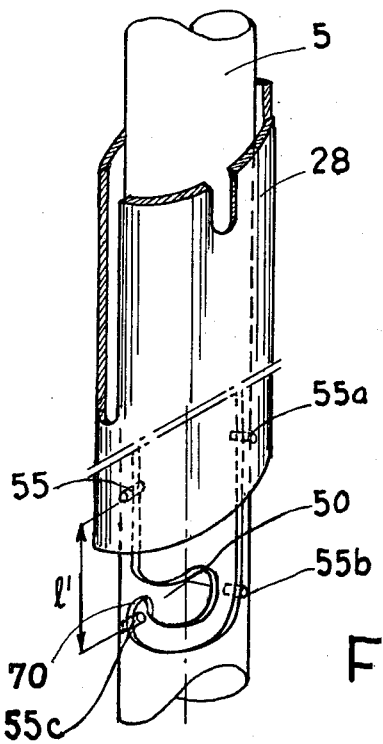
FIG. 8 is a perspective view of the control rod in the high position at the level of the external actuating sleeve.

When the control rod 5 arrives in its high position as illustrated in FIG. 8, a groove 50, in the form of a loop, machined in the lower portion of this control rod, comes to the level of the external sleeve 28 which comprises a stud 55 directed towards the interior of this sleeve, the stud 55 coming inside the groove 50.

If the electro-magnet 41 is then energized, a rotation of a quarter of a turn of the external sleeve 28 is caused as described previously, which brings the stud 55 into the position 55a.

A supplementary raising of the control rod by a length l' beyond the high position used during the regulation of the power of the reactor, causes the stud 55 to pass into the position 55b, which causes the engagement of the stud 55 in the lower portion of the groove 50, constituting a bayonet locking system.

If the feed of the coil 41 is now interrupted, the external sleeve 28 effects a rotation through a quarter of a turn inverse to the preceding rotation, which brings the stud 55 into the locking position 55c in which the rod 5 is suspended from the sleeve 28 by means of the stud 55 on which the control rod 5 rests by means of the end 70 of the loop-shaped groove machined in the control rod 5.

The control rod 5 is then suspended in the high position, independently of its displacement device, which assures its retention during the displacements of the rod.

If an accidental breakage of this device occurred, the control rod 5 would be braked at the end of its travel by the damping device 26, the pin 17 coming into the position 17c inside the aperture 20.

The sealed casing 40 of the device consists, on the other hand, of a plurality of parts such as 40a and 40b connected by a thread 60, a seal 61 and a welding bead 62 assuring the sealing of the assembly.

In the event of a breakdown in the automatic uncoupling device which has just been described, it is possible to open the casing at the level of the seal 61 by machining the weld 62 and unscrewing the portion 40a of the casing.

Access is thus obtained to the upper threaded portion 65 of the rod 67 to which a tool equipped with a handle can be fixed to raise the rod 67 manually. During the movement, the member 67a rises and, after having effected the travel permitted by the movement of the pin 68 in the grooves 71 and 72, it raises the lower central rod 10, compressing the spring 69. The movement of the rod 10 distances the spacing member from the strips 8 and 9, which then permits the uncoupling of the control rod 5 and of the absorbing element 1.

This maneuver is therefore completely identical to that which was known in prior art devices.

It will be seen that the advantages of the device according to the invention are to be able to effect the coupling and the uncoupling of two elongated elements such as a control rod and a control bar of a nuclear reactor, even if the junction zone is not accessible.

In the case of control rods and control bars of nuclear reactors, this possibility of automatic remote action on the coupling and uncoupling of the rod and of the bar enables the operations of recharging the reactor with fuel to be carried out much more rapidly and without manual intervention in zones which may be contaminated.

On the other hand, the possibility of locking the control rod in the high position likewise enables these recharging operations to be facilitated.

It should be noted that the locking device uses only a coil disposed round the casing of the mechanism and acting on a screw and nut system as an active element, the other movements of the movable parts being obtained from the displacement of the control rod itself. The means for displacing this control rod are in any case necessarily associated with this control rod which serves for the control of the reactor.

The invention is not limited to the embodiment which has just been described, but also comprises various modifications.

Thus, the member 23 effecting the locking of the spacing member in an angular position is not absolutely necessary, and it is possible to envisage a device which does not comprise a locking member. It is likewise obvious that the external actuating sleeve 28 does not necessarily comprise two sets of longitudinal grooves and may be replaced by simpler systems in which the pin 17 is placed directly, when the control rod is in the low position, in a set of grooves enabling the rotation of the internal sleeve and of the spacing member to be obtained by rotation of the external sleeve.

It is also possible to use substitutions for the groove 50 of the bayonet closure permitting the locking of the control rod in the high position. It is also possible to fix the locking stud on the control rod and to machine the groove in which it engages for the locking, in the external actuating sleeve.

Finally, the invention does not apply solely to pressurized water reactors but also to high-temperature reactors and to fast-neutron reactors cooled by liquid metals.

More generally, the invention applies whenever an element of great length is used to drive another element of great length which is connected thereto, where the junction zone between these the driving and driven elements is not accessible. These driving and driven elements may be disposed vertically or not and may be displaced in any direction corresponding to the direction of the axis of the driving and driven elements.

We claim:

1. A device for the remote coupling and uncoupling of two elements of great length disposed coaxially and end to end, the first of said elements being a drive element axially displaceable between two extreme positions by displacement means, the second of said elements being a driven element exerting a force resisting the drive, said drive element comprising, at one of its ends, at least two resilient junction portions with deformation in a direction perpendicular to the axis of said elements, maintained spaced apart in junction position in which they engage in a seating formed at one end of said driven element, by a spacing member with axial displacement fixed to the end of a central rod disposed along the axis of the elements, said device comprising (a) a cylindrical internal actuating sleeve (14) coaxial with said drive element (5), mounted for rotation about its axis on said drive element (5), and rigidly connected, for rotation about its axis, to said central rod (10, 67) carrying said spacing member (12), the dimensions of said spacing member (12) being asymmetrical in relation to its axis of revolution, whereby, upon rotation of said central rod (10, 67) about the axis of said device, said spacing member (12) is selectively located in a position for spacing apart said resilient junction portions (8, 9) and in a position out of service in which it is no longer in contact with said resilient portions (8, 9);

(b) a pin (17) disposed transversely in relation to the axis of said device, fixed to the end of the assembly consisting of said internal actuating sleeve (14) and said central rod (10, 67) opposite to the end rigidly connected to said spacing member (12); and (c) an external actuating sleeve (28) coaxial with said drive element (5), having a diameter larger than the diameter of said internal sleeve (14), disposed in a fixed axial position in relation to said drive (5) and driven (1) elements, for rotation about its axis, connected to a means for driving in rotation (30, 33, 35, 41, 43, 44) in one direction and in the other with an amplitude of rotation equal to the angle of rotation necessary to displace said spacing member (12) between its positions in and out of service, and comprising, on its lateral surface, longitudinal slots (45), the axial displacement of said drive and driven elements (1, 5) positioning said pin (17), in the vicinity of one of the extreme positions of these elements, inside the slots (45) in said external actuating sleeve (28) which can then displace in rotation the assembly carrying said spacing member (12) to effect coupling or uncoupling of said drive (5) and driven (1) elements.

2. A coupling and uncoupling device as claimed in claim 1, wherein said central rod (10, 67) comprises a lower portion (10) which is rigidly connected to said internal sleeve (14) for rotation therewith and carrying said spacing member (12), and an upper portion (67) carrying said transverse pin (17), said two portions (10, 67) of said central rod being rigidly connected for rotational movement and sliding in the axial direction as a result of a mounting comprising two stops permitting relative sliding of a predetermined amplitude.

3. A coupling and uncoupling device as claimed in claim 2, wherein said external sleeve (28) comprises at least two sets of slots (45, 47) to guide said transverse pin (17) in two different vertical positions, said drive element (5) being rigidly connected to a means for locking said central rod (10, 67), preventing its rotational displacement, said means consisting of a cylindrical sleeve (23) having the axis of said central rod (10, 67) as its axis and comprising, on its lateral surface, an aperture (20) traversing said surface, inside which the ends of said pin (17) engage in locking and unlocking position by relative movement of said drive element (5) and of said upper portion (67) of said central rod when the latter rests on the external sleeve by means of a set of slots (45, 47).

4. A coupling and uncoupling device as claimed in claim 1, 2 or 3, wherein said drive element is movable between one extreme position where the uncoupling takes place and another extreme position where it can be held independently of the action of its displacement means, said drive element (5) comprising, at its end within said external actuating sleeve (28), when the element is in its extreme position where it is held uncoupled, a locking groove (50), said external actuating sleeve (28) being rigidly connected to a stud (55) directed towards the inside of said sleeve, said stud engaging in said groove when said element is in the extreme position, under the effect of the translation movements of said drive element (5) and the rotation movements of said external sleeve (28), to constitute, with said groove (50), a bayonet connection holding said element (5) uncoupled in the extreme position.

5. A coupling and uncoupling device as claimed in claim 1, 2 or 3, wherein said drive element is movable between an extreme position where the uncoupling takes place and another extreme position where it can be held independently of the action of its displacement means, said drive element (5) comprising, at its end within said external actuating sleeve (28), when the element is in its extreme position where it is held uncoupled, a stud directed towards the internal surface of said external sleeve (28), said external actuating sleeve comprising a locking groove, said stud being engaged in said groove when said element is in the extreme position, under the effect of the translation movements of said drive element and the rotation movements of said external sleeve, to constitute, with said groove, a bayonet connection holding said element (5) uncoupled in the extreme position.

* * * * *